United States Patent [19]

Fuller et al.

[11] 4,090,230

[45] May 16, 1978

[54] HIGH VOLTAGE MOTOR STARTER ENCLOSURE

[75] Inventors: Frederick B. Fuller; Miklos J. Orosz; Richard H. Williams, Jr., all of Columbia; Glen F. Diimmler, Irmo, all of S.C.

[73] Assignee: Square D Company, Park Ridge, Ill.

[21] Appl. No.: 767,278

[22] Filed: Feb. 10, 1977

[51] Int. Cl.² ............................................. H02B 1/14
[52] U.S. Cl. ................................... 361/345; 361/339
[58] Field of Search ..................... 200/50 A, 50 AA; 361/334, 335, 338, 339, 343, 344, 345; 363/125, 126

[56] References Cited

U.S. PATENT DOCUMENTS

| 2,914,707 | 11/1959 | Timmerman | 361/345 |
| 3,403,239 | 9/1968 | Schramm | 361/335 |
| 3,633,075 | 1/1972 | Hawkens | 361/344 |
| 3,896,353 | 7/1975 | Burton | 361/339 |

*Primary Examiner*—Gerald P. Tolin
*Attorney, Agent, or Firm*—M. J. Femal; W. H. Schmeling

[57] ABSTRACT

A high voltage motor starter enclosure includes a floor mounted vertical section consisting of three starter cells, stacked one on top of the other, each cell being suitable to mount one full voltage, non-reversing, squirrel cage starter having a contactor of the air break type. Each starter cell consists of four distinct, isolated compartments: a line and vertical bus compartment containing space for incoming line cables and vertical bus; a load compartment containing space for starter current transformers and motor cables for individual starters; a low voltage control compartment having a drawout, swing-open compartment door (panel) to provide easy access to meters, relays, pilot devices and terminal blocks for inspection and maintenance thereof; and a high voltage contactor compartment containing mechanical and electrical interlocks to minimize electrical hazards, a hinged door to provide easy access to a contactor and related component parts, and to the line and vertical bus, and load compartments by removing barrier cover plates. Wheel assemblies are mounted on each contactor so that the contactor rolls into both fully engaged and disengaged positions upon a contactor rail assembly which is part of a removable tray positioned beneath the contactor to support the same. The removable tray further includes several mechanical interlocks, a shutter operator mechanism for operating a shutter plate assembly to isolate the line and load terminals from the contactor, a positive ground connection assembly so that the contactor is grounded in the engaged and disengaged positions, a contactor stop assembly, and a bottom barrier plate for isolating the high voltage contactor compartments of each cell from one another. A drawout handle moves the contactor carriage upon the rail assembly, draws out the contactor disconnecting both line and load connections, and disconnects the primary of the control transformer. A thumbscrew mounted on the drawout handle functions as a mechanical and electrical interlock. When the thumbscrew is loosened or disengaged from a mechanical interlock of the drawout handle, it disconnects the secondary of the control transformer in the low voltage circuit of the contactor and it permits the drawout handle to be pulled down to draw out the contactor to a test position. A choke in parallel with normally closed contacts is inserted in series with the contactor coil after the coil is energized and the contacts open to act as an economizing circuit. Control transformer fuses are mounted directly to the power fuse stop bracket to prevent any nonfused protected wire between the high voltage source and the control power transformer's high voltage primary.

9 Claims, 31 Drawing Figures

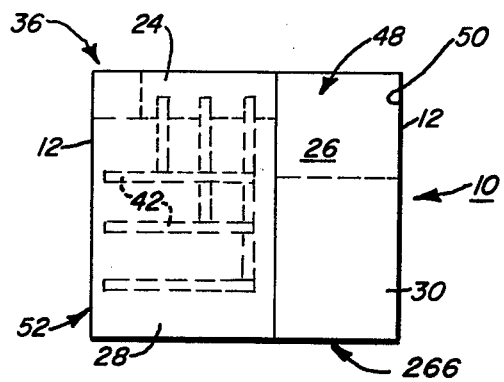
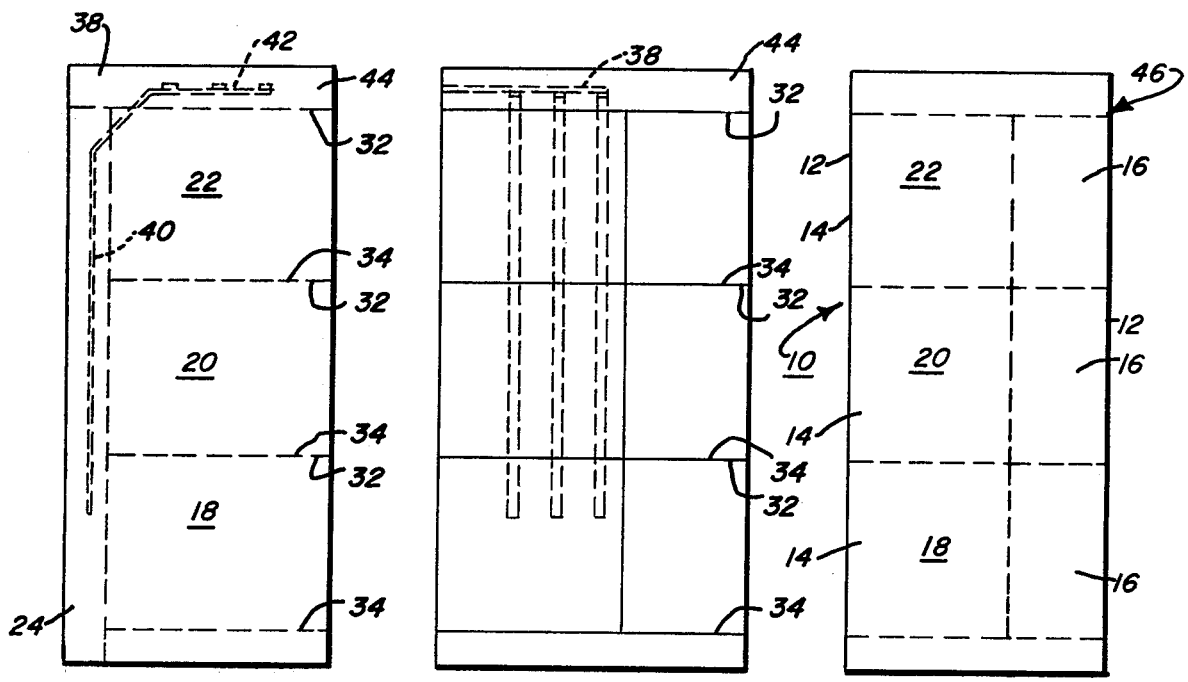
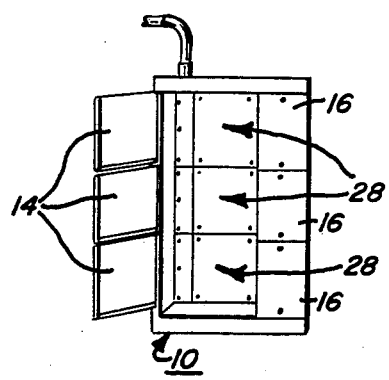

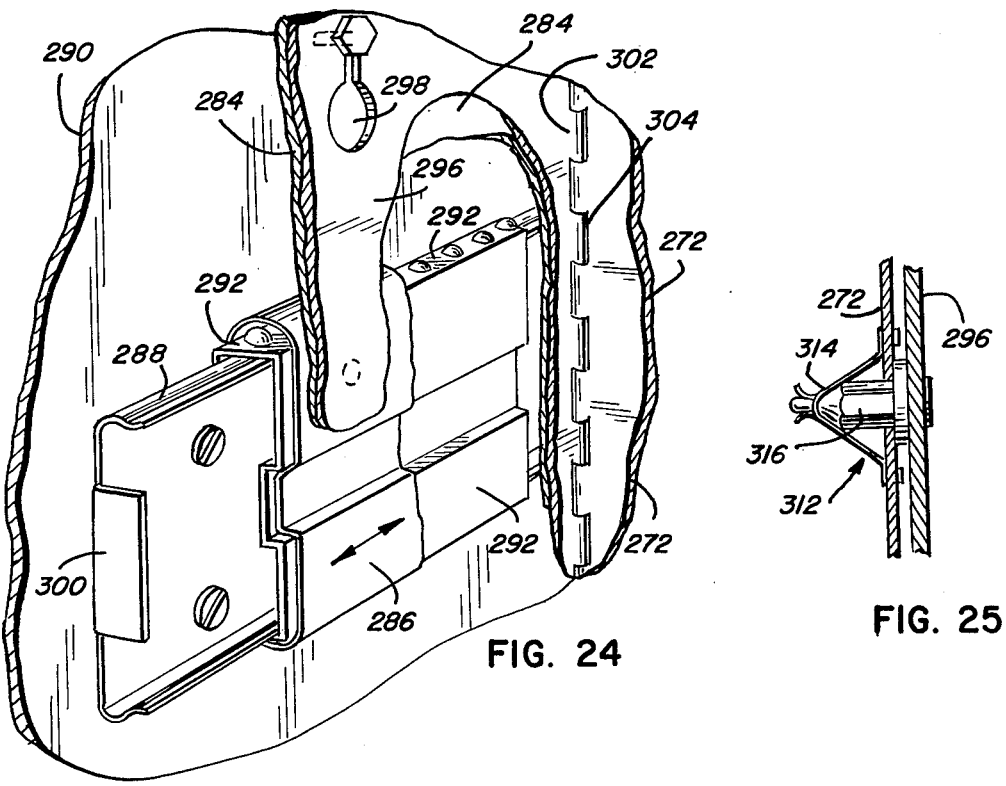
FIG. 24
FIG. 25
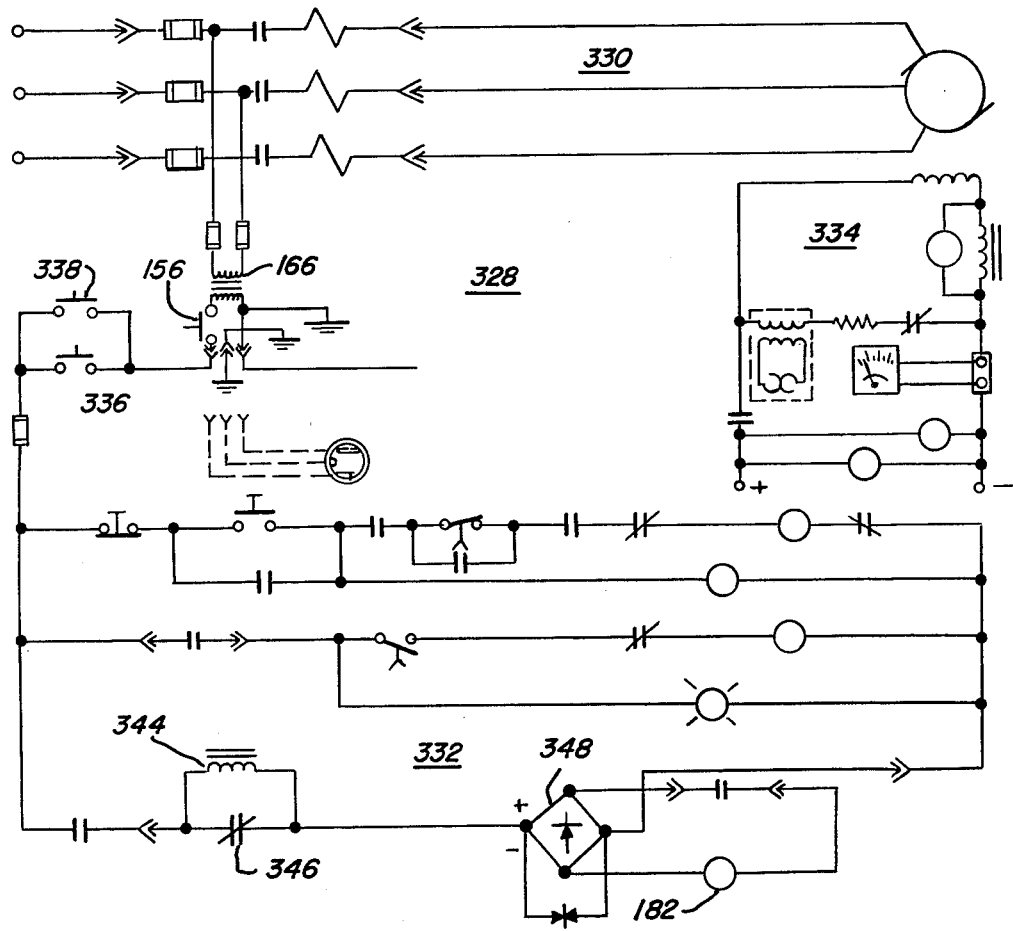
FIG. 13

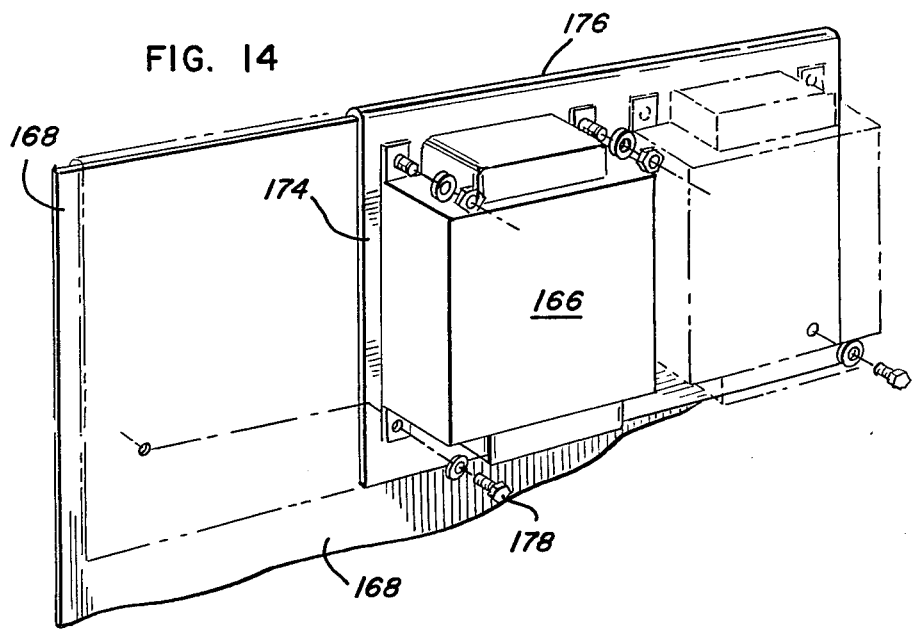
FIG. 14
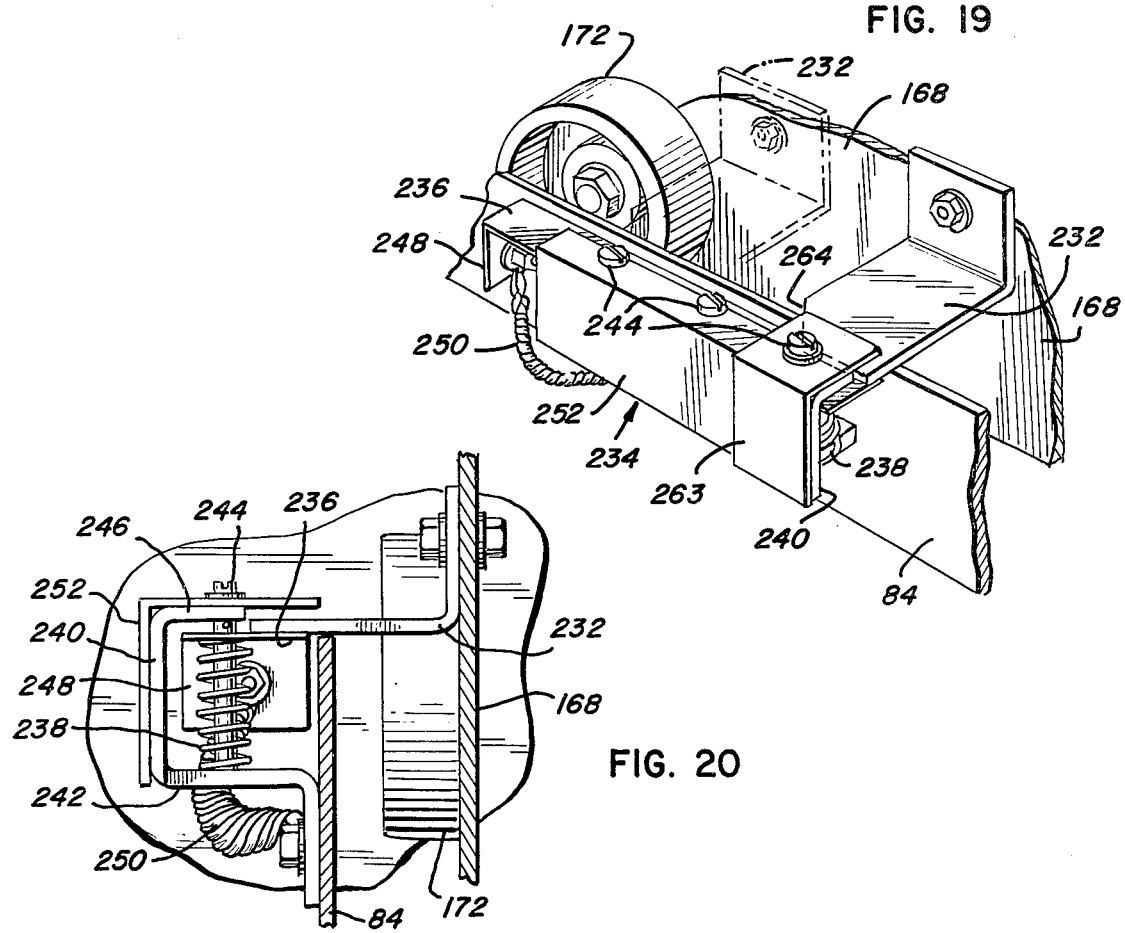
FIG. 19
FIG. 20

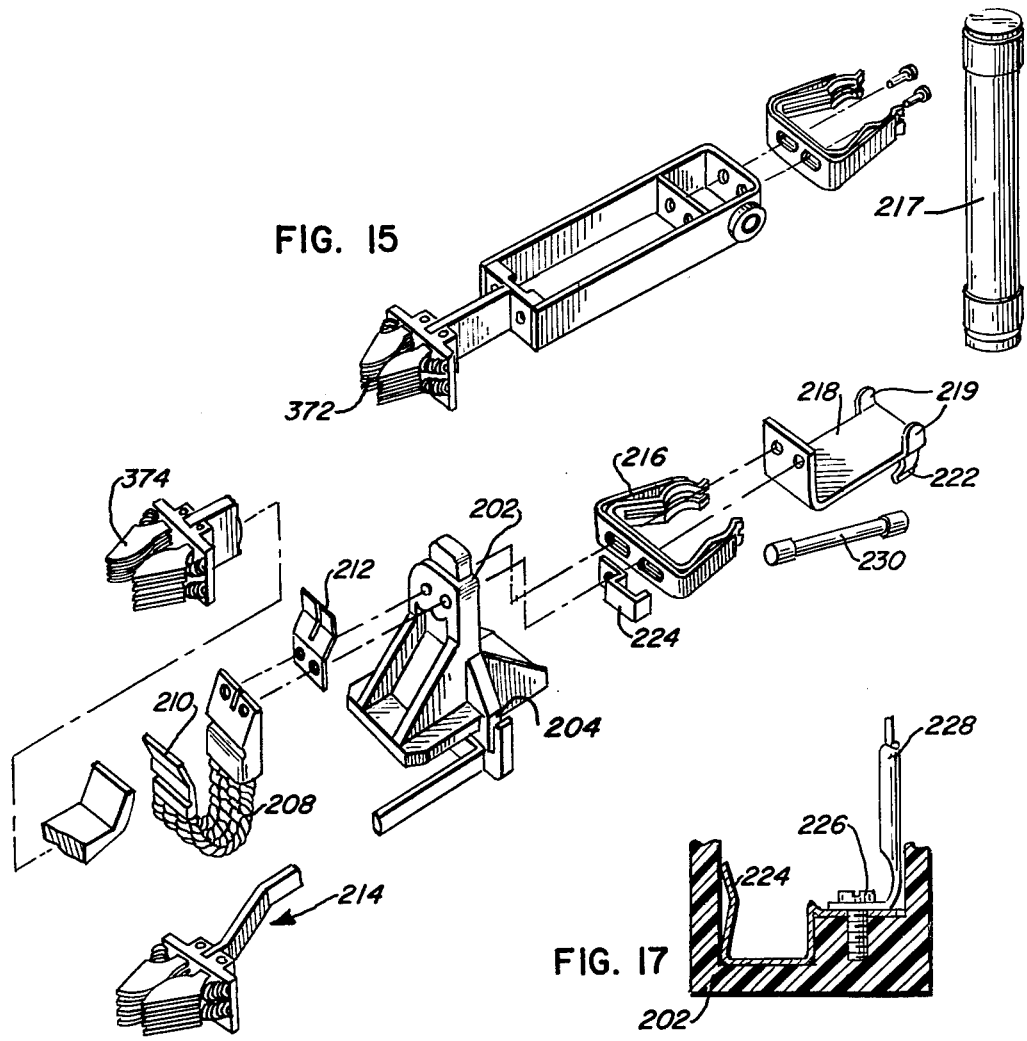
FIG. 15
FIG. 17
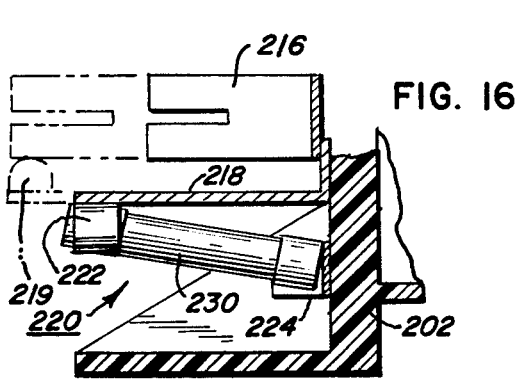
FIG. 16
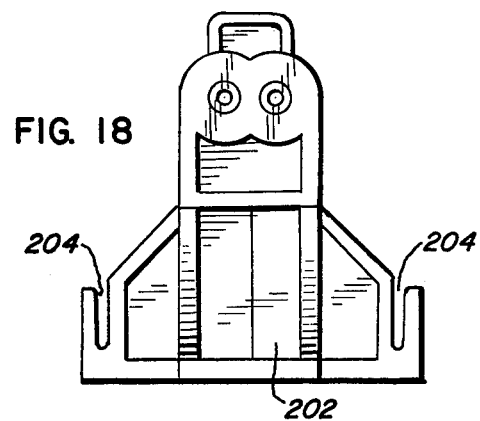
FIG. 18

HIGH VOLTAGE MOTOR STARTER ENCLOSURE

BACKGROUND OF THE INVENTION

This invention relates to high voltage motor starters and more particularly, to a three-high high voltage motor starter enclosure including starter cells having compartments isolated from one another, mechanical and electrical interlocks to minimize electrical hazards, and front accessibility to all components and wiring to facilitate quick and easy inspection or component replacement.

Larger motors are frequently applied today to drive various machines and pumps to improve plant efficiency. For horsepower above 200, the overall cost of installation favors 2,000 to 5,000 volt motors. These types of motors require high voltage motor starters having electromagnetically operated air break contactors suitable for repeatedly switching polyphase circuits carrying large alternating currents at moderately high voltages and for interrupting such circuits under full load conditions even when the available short-circuit capacity (Three Phase Symmetrical) of the circuits is as high as 50 MVA, unfused, and up to a maximum of 350 MVA, fused.

Although high voltage air break contactors have been successfully designed as illustrated in U.S. Pat. No. 3,403,239 issued to Schramm et al on Sept. 24, 1968, the high voltage motor starter enclosures lagged far behind in providing accessibility to all of the components mounted within the enclosure. Prior art enclosures also has few mechanical and electrical interlocks to minimize electrical hazards. Recently, there has been a general recognition that the high voltage motor starter enclosures should include more than one starter cell and as many as three full voltage, non-reversing, squirrel cage starters or room to mount other motor starter configurations within a single enclosure. Furthermore, prior art starters lacked starter cell compartments which were isolated from one another such as line and load compartments. Also, the prior art enclosures seldom provided a means for withdrawing the contactor from both line and load connections with shutters that close over line and load connections to isolate the line and bus compartments from the high voltage contactor compartment while providing simple mechanical interlocks that operate separately from the drawout handle so that even if the mechanical interlocks usually associated with the drawout handle are defeated, the contactor cannot be racked into an energized position when the door of the high voltage compartment is open.

One further disadvantage of the prior art high voltage motor starter enclosures was the inaccessibility to the power and control transformer fuses, coils, relays, current transformers, and other electrical components located in the various compartments of each cell when the enclosures were up against a wall or in line with other switch gear cabinets.

Moreover, many of the prior art enclosures with only mechanical interlocks on their drawout handle included few electrical disconnects in the secondary of the control transformer to assure the safety of authorized service personnel.

SUMMARY OF THE INVENTION

With this invention, the foregoing problems are substantially solved. The cabinet enclosure of the present invention makes it practical to group three full voltage non-reversing 5,000 volt squirrel cage motor starters in vertical alignment within a single enclosure with the high and low voltage compartments of each starter cell being fully isolated between cells and from one another. This enclosure also utilizes a particularly advantageous cell tray which is removable from the vertical section. The cell tray which is positioned beneath the contactor includes a contactor rail assembly for guiding the contactor into and out of engagement with the line bus and load connections, a shutter assembly for closing shutters over the line and load connections to isolate the line and bus compartment from the high voltage contactor compartment, a positive ground connection operatively engaging the contactor in both its fully engaged and disengaged (test) positions and all positions therebetween, and various mechanical interlocks to prevent disengaging the contactor from line bus when the contacts are closed, engaging contactor to line bus with high voltage compartment door open, and engaging contactor to line bus with contacts closed in a test position. The cell tray with all its various mechanisms provides still other advantages. The bottom of the tray serves as an electrical as well as the only physical barrier between the high voltage contactor compartments of each three-high enclosure so that by removing the trays, an installer can walk into the three high enclosure much like a telephone booth and install the motor leads, line leads and service other components of the starter. Thus this motor enclosure of the present invention makes it particularly easy to install, service, and maintain the high voltage motor starter.

It is an object of this invention to provide an improved high voltage starter enclosure of the three high two-high plus one-high, construction that utilizes an air break contactor in alternating current circuits of moderately high voltage which is easy to service and maintain.

Yet another object is to provide a three-high voltage starter enclosure with isolated compartments that make it easy to install and maintain the components of the high voltage starter without reducing the safety and reliability of the unit.

A further object is to provide an improved drawout assembly which moves the contactor into fully engaged and disengaged (test) positions.

Another object is to provide an improved drawout design which permits removal of the contactor from the cell without disconnecting any high voltage cables and in which the low voltage connections to the contactor are made with a quick disconnect plug.

A further object is to provide a high voltage starter enclosure with an improved system of mechanical and electrical interlocks for the high voltage as well as the low voltage compartments.

Still another object is to provide an improved means of fusing the primary of the control transformer without any unfused wires.

Another object is to provide an improved means of positively grounding the sliding contactor unit to the frame of the high voltage motor starter enclosure or to a ground bus in both fully engaged and disengaged positions and any other position in between these two positions.

An additional object is to provide an improved low voltage compartment in which the controls such as meters, pushbuttons, relays, and pilot devices mounted on the compartment door as well as the terminal blocks mounted on the rear of the compartment are more easily serviced on the door panels and rear wall because of the door construction.

Yet another object is to provide a high voltage motor starter enclosure in which the high voltage compartment in an unprepared cell is totally metal enclosed to isolate it from the line bus and an unprepared cell can easily be prepared for installating a future starter in the field.

Still yet another object is to provide a d.c. operated coil to ensure quiet operation and an economizing reactor mounted on the contactor to minimize heat losses in the coil circuit and to increase coil life.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is therefore made to the claims for interpreting the scope of the present invention.

BRIEF DESCRIPTION OF THE DRAWINGS

FIG. 2 is a top view of the enclosure of FIG. 1, with incoming horizontal line bus and interconnected vertical line bus shown in phantom;

FIG. 3 is a side view of FIG. 2 showing the vertical line bus and the horizontal incoming line bus in phantom;

FIG. 4 is a front view of FIG. 3 showing the incoming line bus and the vertical line bus in phantom;

FIG. 5 is a front elevation of enclosure of FIG. 4 showing the compartment of each starter cell in broken line;

FIG. 6 is a front elevation of the enclosure of FIG. 5 with the components of the starter removed from the high voltage compartment thereof;

FIG. 13 shows a synchronous motor starter circuit;

FIG. 14 is a fragmentary side view of a transformer mounting assembly;

FIG. 15 is an exploded view of certain power and control components of the contactor;

FIG. 16 is a view in partial cross-section of the control fuse assembly;

FIG. 17 is a bottom fragmentary view of FIG. 16;

FIG. 18 is a rear elevation of the insulating pedestal shown in FIG. 15;

FIG. 19 is a perspective view of the ground assembly;

FIG. 20 is an end view of the ground assembly;

FIG. 24 is a fragmentary view of the suspension of the low voltage drawout assembly;

FIG. 25 is a view showing a spring clip latch for the door of FIG. 24;

DESCRIPTION OF THE PREFERRED EMBODIMENTS

Figure 1:
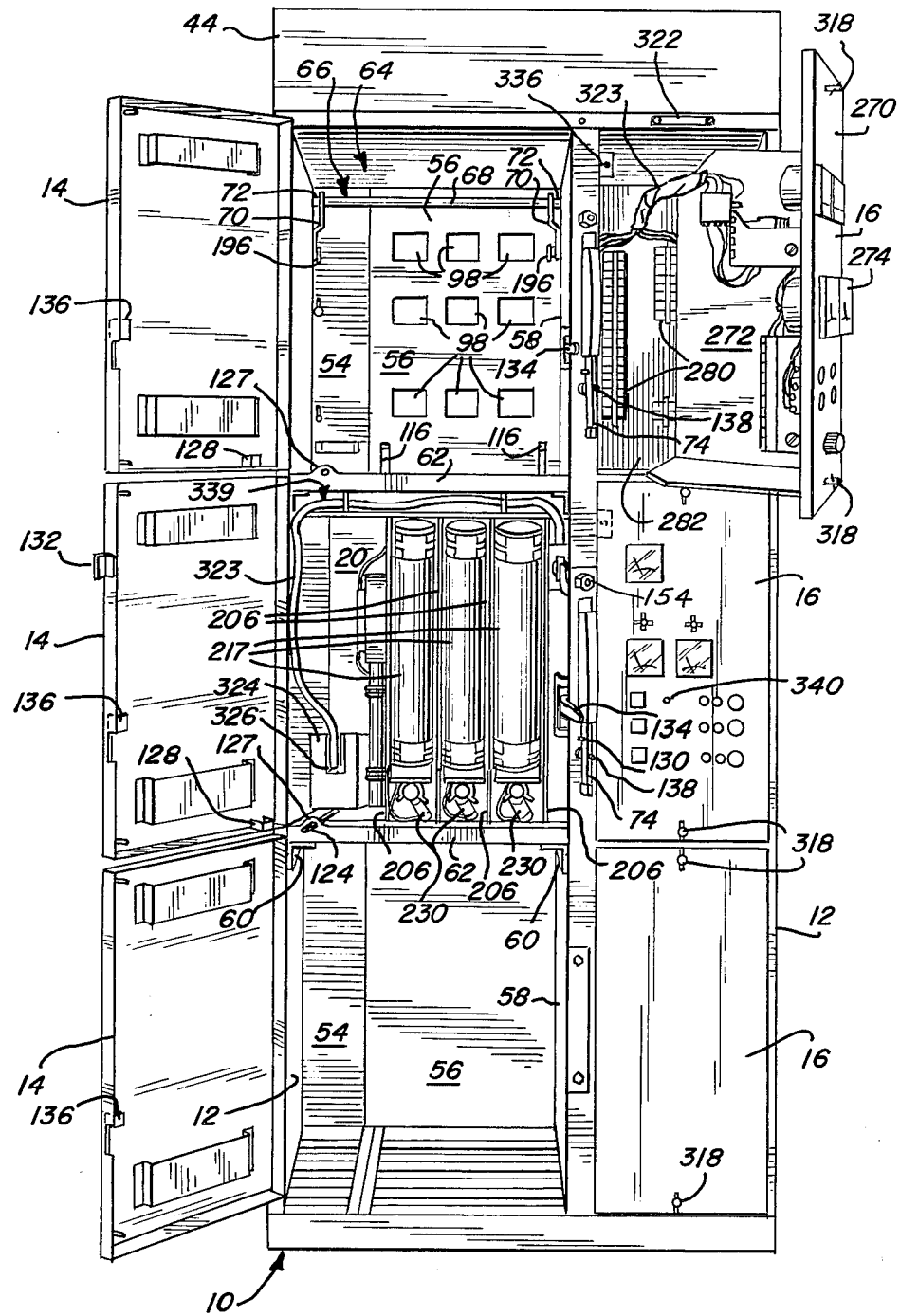
FIG. 1 is a perspective view of the high voltage motor starter enclosure embodying the present invention, with the high voltage compartment doors swung open.

As shown in FIG. 1, a steel enclosure 10 consists of a front and rear jig welded vertical frame which is formed of angles and channels. The sides 12 of the enclosure are shallow channels which are bolted to the enclosure frame with truss head fasteners or the like. Doors 14 and 16 of the high voltage and low voltage compartments, respectively, are pan type with flanges formed to provide sturdy rigid structures with door latches and hinges that are capable of holding the doors closed during maximum fault conditions. The steel cabinet 10 is divided into three vertical sections 18, 20 and 22 which are stacked one on top of the other. Each vertical section forms a starter cell which consists of the following four distinct isolated compartments (FIG. 2): (1) a line and vertical bus compartment 24; (2) a load compartment 26; (3) a high voltage contactor compartment 28; and (4) a low voltage control compartment 30.

The line and vertical bus compartment 24 extends from the top 32 to bottom 34 in left rear portions 36 of each vertical section as shown in FIGS. 2—6. Space is provided in the compartment for terminating up to and including either 2–500 MCM or 1–750 MCM cable per phase with top 38 or bottom entry (not shown) into the compartment 24. Space is also provided for stress cones (not shown). Vertical bus lines 40 extend approximately the length of the enclosure, one for each phase, and are securely supported on 5kv fiberglass polyester supports. These vertical buses 40 may be connected to horizontal bus 42 located in an optional horizontal bus compartment 44 which is mounted on top 46 of the enclosure 10 and is isolated therefrom.

The load compartment extends from the top 32 to bottom 34 in the right rear portion 48 of each vertical section. Space is provided for terminating 1–250 MCM cable per phase with top or bottom entry. Space is also provided for stress cones. Moreover, space is provided for mounting either donut type current transformers or bar type current transformers (not shown) adjacent the outer right side wall 50. The load cables are connected to separate terminal pads on stand-off insulators or to the bar terminals of the bar type transformer, when used (all not shown). An isolating barrier may be inserted between load compartments of the vertical sections.

As shown in FIGS. 1-6, the high voltage contactor compartment 28 is located in the left front portion 52 of each vertical section (starter cell) and includes mechanical and electrical interlocks (to be described in greater detail later) to minimize electrical hazards. The high voltage compartment has one of the hinged doors 14 to provide easy front accessibility to all components therein and to the line and vertical bus compartment 24, and load compartment 26 by removing screw fastened metal cover barriers 54 and 56 (barrier 56 being a non metal shutter plate assembly in a prepared cell), and a screw fastened metal cover barrier 58, respectively. A pair of steel angles 60 are bolted to the vertical framework on opposite sides of the high voltage compartment as shown in FIG. 1. The angles 60 horizontally support a cell tray 62 (to be described in greater detail later).

Mounted at the top rear portion 64 of the high voltage compartment 28 is a drawout arm assembly 66 for moving the contactor within the compartment. The drawout arm assembly 66 comprises a drive shaft 68, a pair of arms 70 spaced apart on the shaft 68 for drivingly engaging a contactor carriage, a pair of drawout shaft bearing brackets 72 rotatably mounting the shaft 68 therebetween, and a second pair of steel angles 60 mounted to the vertical frame at the top of the high voltage compartment 28 to support a cell tray of the vertical section immediately above it and to support the bearing brackets 72.

A drawout handle 74 located midway between the top 32 and bottom 34 of the high voltage compartment on the right side thereof is mounted on the vertical frame member between the high and low voltage compartments. The handle 74 in each cell is operatively connected to suitable linkage to pivot the pair of arms 70 into both engaged and disengaged contactor positions when the handle 74 is operated from an "up" to a "down" position, respectively, approximately a 150° arc.

Figure 7:
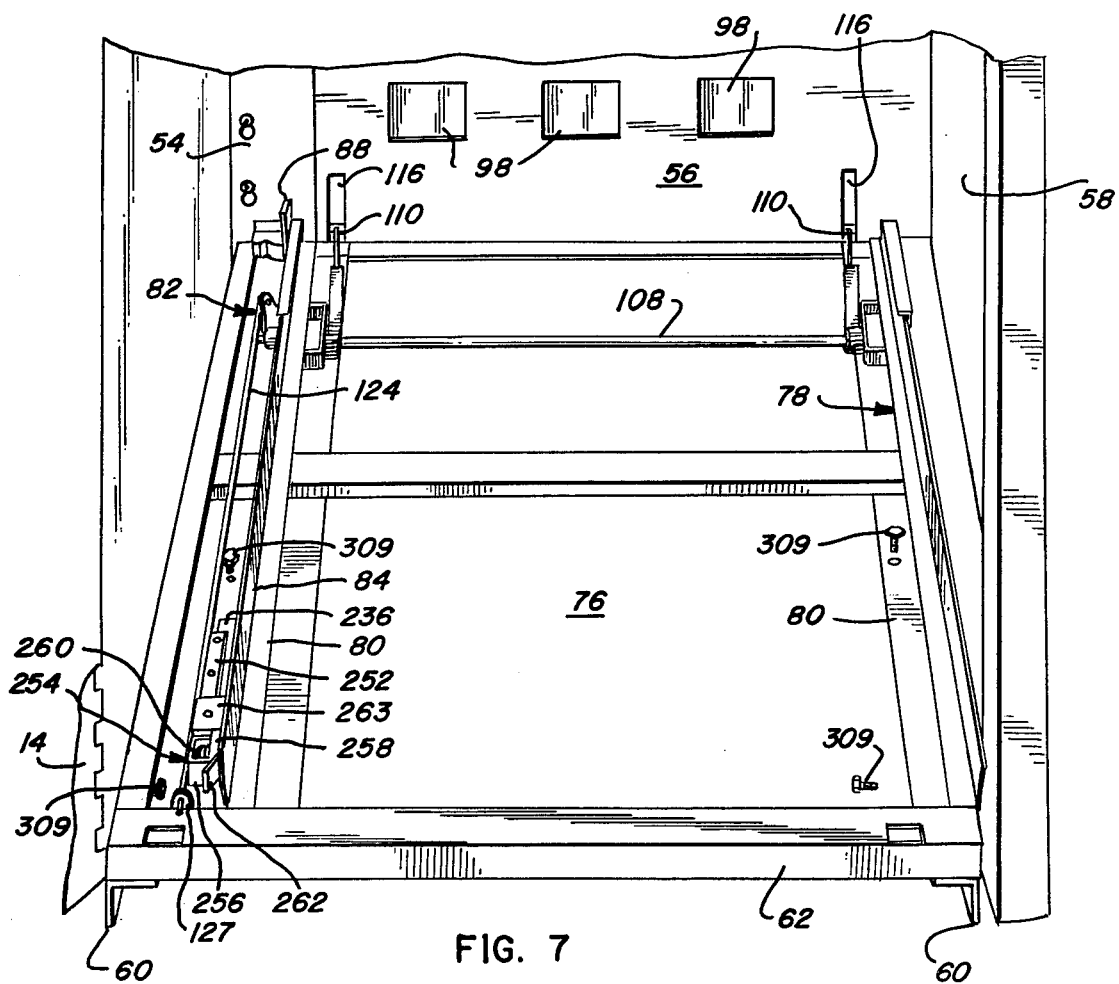
FIG. 7 is a fragmentary view showing the removable cell tray with its various mechanisms and interlocks.
Figure 8:
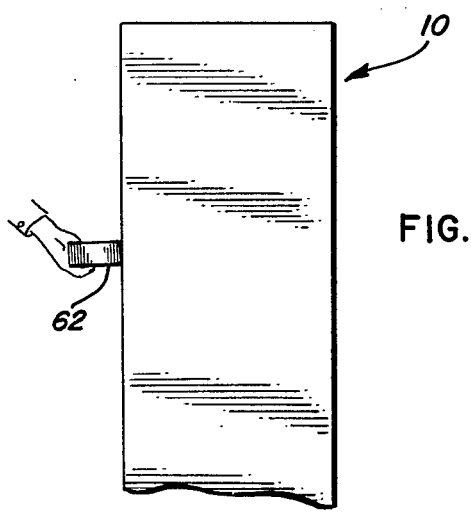
FIG. 8 is a side fragmentary view of the enclosure showing the removal of a cell tray like that of FIG. 7.
Figure 9:
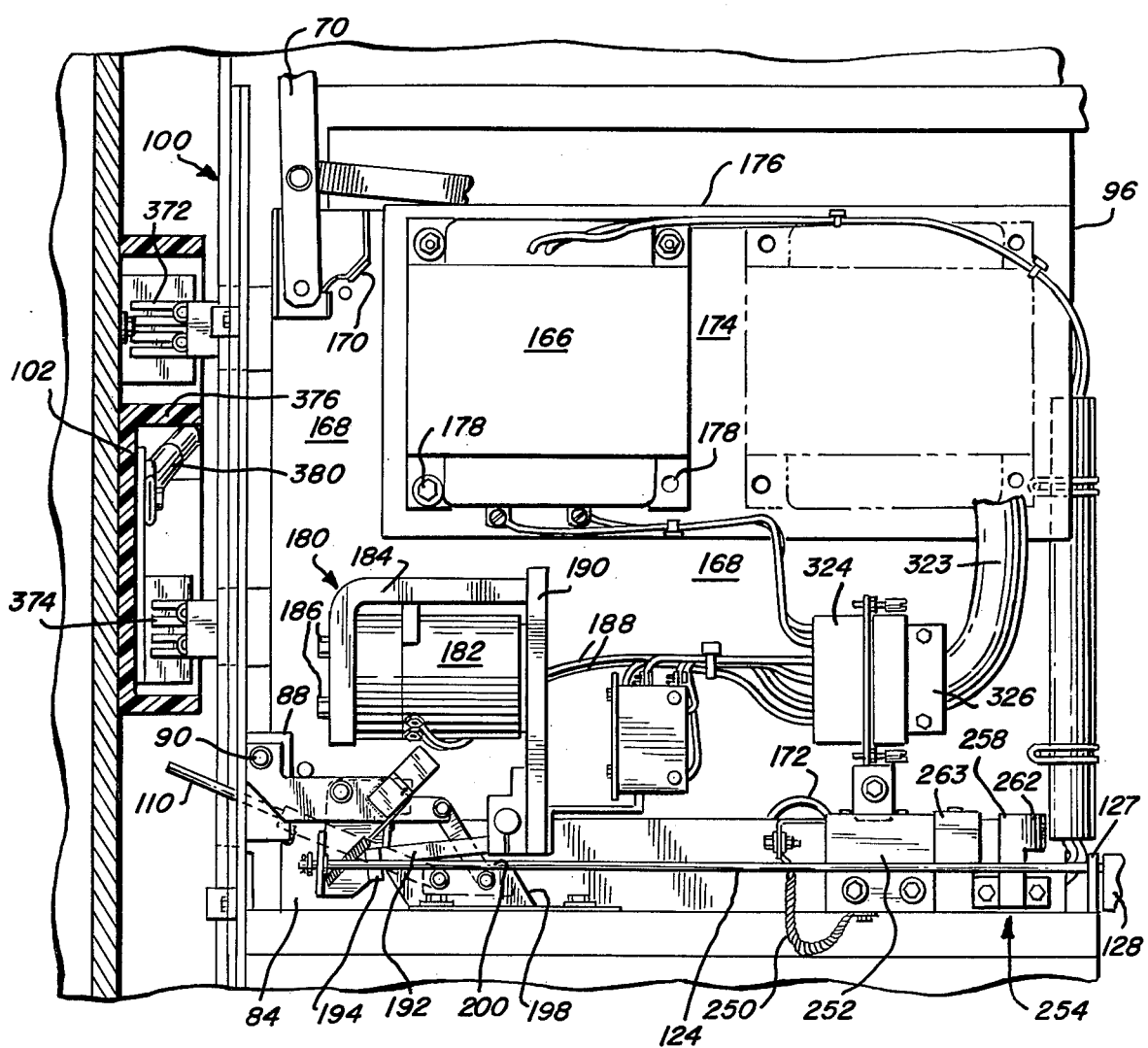
FIG. 9 is a side fragmentary view of a high voltage contactor in its engaged position operating its associated shutter mechanism.
Figure 10:
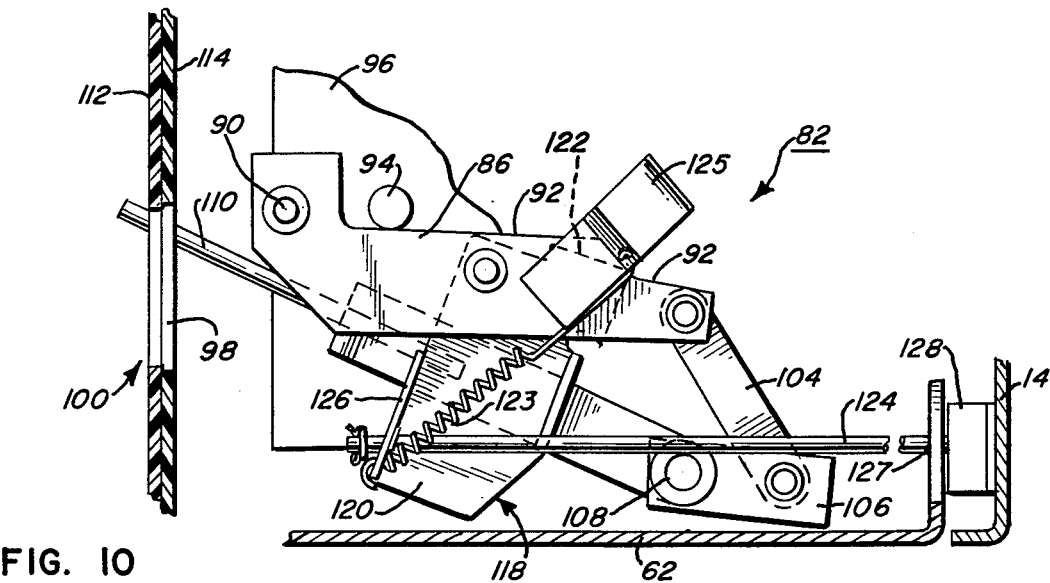
FIG. 10 is a side fragmentary view of a shutter mechanism with the contactor in its engaged position.
Figure 11:
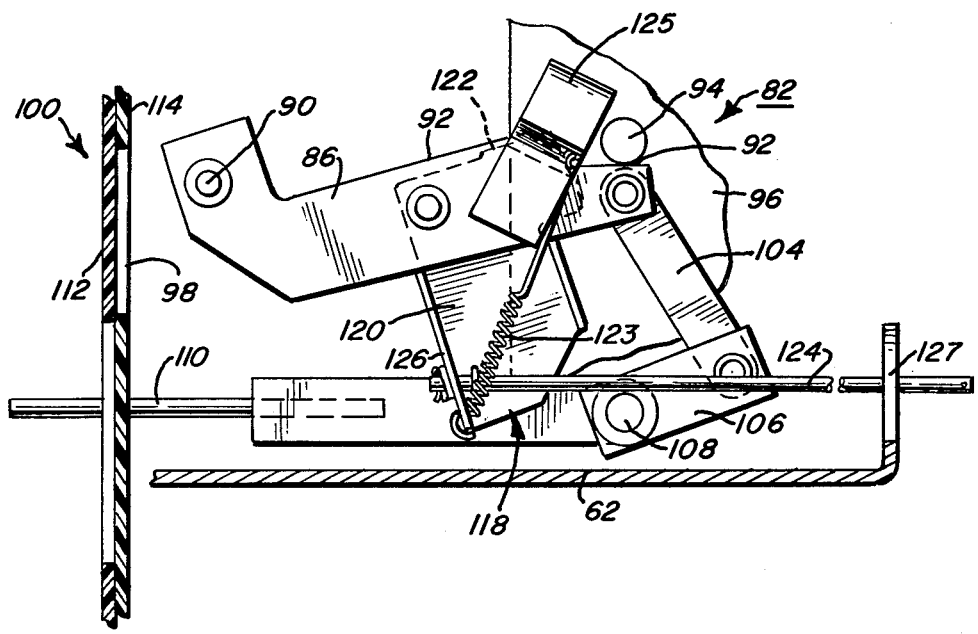
FIG. 11 is a fragmentary side view of the shutter mechanism of FIG. 10 with the contactor in its disengaged position.
Figure 21:
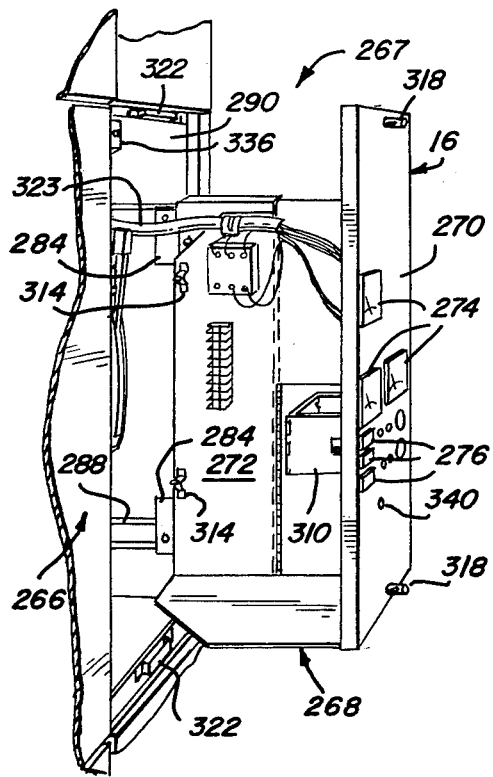
FIG. 21 is a fragmentary side view of the low voltage drawout assembly.

Referring now to FIGS. 7 and 9, the cell tray 62 is shown in greater detail and comprises a steel bottom plate 76, acting as an isolation barrier between adjacent high voltage compartments, a contactor rail assembly 78 consisting of a pair of rail guides 80 & 84 upon which a contactor rolls into and out of its engaged position. The cell tray also includes a shutter operating mechanism 82 incorporating mechanical interlocks for the contactor mounted on the rear portion of the left rail guide 84. The shutter operating mechanism 82 includes a generally L-shaped member 86 pivotally mounted at one end to a rectangular plate 88 extending up from the rear of the left rail guide 84 by a pin 90 as shown in FIGS. 9, 10 and 11. The member 86 extends generally in a horizontal plane parallel to the rail guide 84 with its upper surface forming a camming surface 92 which engages a cam follower 94 located on the lower rear left side of a contactor 96 (to be described in greater detail later). The cam activates the shutter mechanism 82 which opens and closes three rows of shutter windows 98 on a shutter plate assembly 100. The shutter windows 98 close over the line and load connections located in a connection box 102 to be described later.

As shown in FIGS. 7, 10 and 11, the shutter operating mechanism 82 comprises a link 104 pivotally mounted at one end to member 86 and at its other end to an arm 106 which is fixedly connected to a shutter drive shaft 108 rotatably mounted and located between the rail guides 84. Shaft 108 includes a pair of shutter fingers 110 located at either end of the shaft 108 which are made of an insulating material at their ends for engaging a movable shutter plate 112 located behind a stationary plate 114.

In operation as shown in FIGS. 10 and 11, the cam follower 94 engages the camming surface 92 of member 86 when racking the contactor 96 rearwardly on the contactor rail assembly 78. As the cam follower 94 moves further along the camming surface 92 it causes the end of member 86 connected to link 104 to pivot downwardly causing the arm 106 to rotate the shaft 108 in a clockwise direction as viewed in FIGS. 10 and 11 which lifts the shutter fingers 110 upwardly. The shutter fingers 110 which engage the lower end of the movable shutter plate 112 slide upwardly in the vertical slots 116 (FIG. 1) of the stationary plate 114 to open the three rows of shutter windows 98 (FIG. 1) and expose the line and load connections.

Moreover, the shutter mechanism 82 includes a shutter and contactor interlock mechanism 118 integral therewith. Interlock mechanism 118 includes a bracket 120 pivotally mounted midway between the ends of member 86 so that a raised portion 122 of the bracket 120 extending normal to and above the camming surface 92 locks out the cam follower 94 on a contactor 96 from engaging the camming surface unless the bracket 120 is pivoted so that the raised portion 122 is below the cam surface 92 as shown in FIG. 10. The interlock mechanism 118 serves a dual purpose, first it locks out the operation of the shutter mechanism 82 and secondly it also locks out the contactor 96.

The pivoting of raised portion 122 of the bracket 120 out of a blocking position on the shutter mechanism 82 is achieved by a push rod 124 connected at one end to a flange portion 126 which is normal to bracket 120 and connected thereto and at the other end extending through a guide 127 located on the front end of the tray 62 so that the operation of the shutter mechanism is interlocked with the door. The door 14 includes a push rod operator 128 which extends outwardly from the back of the door to engage the guided end of the push rod 124 when the door is shut. This causes the push rod as it moves rearwardly to pivot the raised portion 122 of bracket 120 below the camming surface 92 of member 86 as shown in FIG. 10. A spring 123, connected between the flange 126 and a bracket 125 mounted on the member 86 and acting as a guide for the cam follower 94 when it first engages the camming surface 92, biases the raised portion 122 into a blocking position when door 14 is open. Therefore, the operation of the shutter mechanism 82 is interlocked with the door so that the door 14 must be closed before the raised portion 122 of bracket 120 is removed from a blocking position of the contactor 96.

The operation of the drawout arm assembly 66 which is operated by the drawout handle 74 is also interlocked with the door 14. The door 14 must be closed before the drawout handle operates vertically through the previously mentioned 150° arc so that in its "up" position a pin 130 (FIG. 1) in the handle engages a stop 132 on the door 14 to prevent opening of the door when the contactor is engaged to line bus, and in its "down" position the contactor is withdrawn from line and load connections, disconnects primary of control transformer, releases a door interlock lever 134 so that the door 14 can be opened and moves the contactor so that the cam follower 94 actuates the shutter mechanism 82 to close the shutters over line and load connections. Moreover, the door 14 must be closed before the drawout handle 74 can be moved into the "up" position. The door interlock lever 134 is biased upwardly to restrict movement of the handle 74 when the door is opened and to engage a lock bracket 136 mounted on the inside of the door. The door locking lever 134 is biased upwardly in such a way that the locking lever 134 continually engages the lock bracket 136 so that the door cannot be open until the handle is in the full "down" position.

Figure 12:
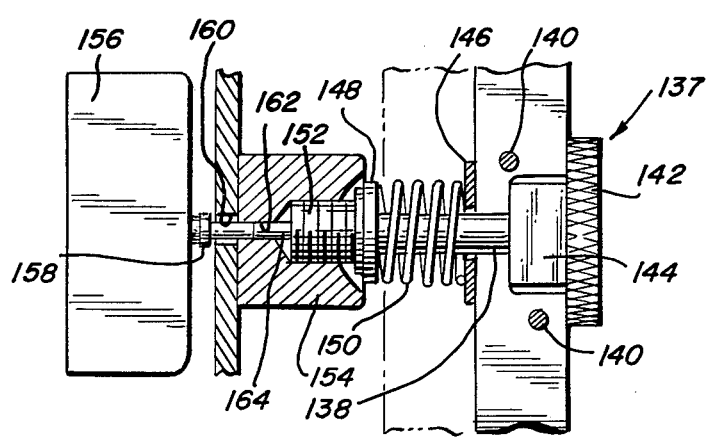
FIG. 12 is a side view, partially in cross-section, of a thumbscrew interlock.

Referring now to FIGS. 1 and 12, a thumbscrew interlock 137 extends through the bifurcated drawout handle 74 with pins 140 loosely maintaining a thumbscrew 138 in a relatively fixed position with respect to the handle. The thumbscrew 138 includes a head portion 142 with a generally rectangular extension 144 extending down the shank of the thumbscrew a predetermined distance, a washer 146 around the shank of the thumbscrew on the side of the handle opposite from the head 142, a ridge 148 extending around the shank on the same side of the handle as the washer and spaced apart from the washer by a spring 150 which biases the rectangular extension 144 into the slot formed by arms of the handle to prevent rotation of thumbscrew. A threaded portion 152 of the thumbscrew 138 threadably engages a threaded, electrical interlock receptacle 154 mounted on the vertical frame opposite the thumbscrew when the drawout handle is in its "up" position with the door 14 closed and the contactor in its engaged position. A pushbutton switch 156 is mounted within the high voltage compartment on the frame opposite from the receptacle 154, and an actuating stem 158 extends through a hole 160 in the frame and into the central passage 162 of the receptacle so that by tightening the drawout handle interlock thumbscrew within the receptacle 154, an end 164 of the thumbscrew engages the stem 158 to close the switch which connects power from the secondary of a control transformer 166 to the coil circuit as shown in FIG. 13. This mechanical and electrical interlock provides a means of slowing down the operation of the drawout handle to prevent the likelihood of having the stabs break current while an arc still exists in the arc chutes. To loosen this unique tightening drawout handle interlock thumbscrew 138, the operator must first push the handle against the bias of the spring 150 to a position as shown in phantom in FIG. 12 whereupon the rectangular extension 144 will be disposed outwardly of the slot in the handle 74 so as to permit the thumbscrew 138 to be loosened and its threaded portion 152 to be disengaged from receptacle 154, thereby opening the switch 156.

FIGS. 1, 9, 14, and 15-18, show the high voltage drawout contactor 96 ideally suited for operation with the above described enclosure 10. The contactor 96 is similar to the one described in Schramm et al U.S. Pat. No. 3,403,239 and includes several improved features to reduce the size, weight and to assure more accurate alignment of the stab connections. A pair of similar side plates with the left side plate 168 shown for illustrative purposes, both include a slotted ear formation 170 in their upper rear corners for receiving the arms 70 of the drawout arm assembly 66 for moving the contactor into and out of an engaged position on the rail assembly 78. The slotted ear 170 provides a guide for a wheel 196 at the end of each arm 70, a non-bolted connection between the arms and contactor, a further contactor stop when the wheel 196 is in the upper right corner of the guide to prevent the contactor from being engaged, and a positive locking in of the contactor into its engaged position with the line bus and load connections as shown in FIG. 9 when the wheel 196 is in the lower left corner of the guide. Mounted on both bottom corners of each side plate is a wheel assembly 172 which rides on the rail guides 80. Above the rear wheel on the left side plate 168 is the cam follower 94 which operates the shutter mechanism 82.

A control transformer mounting plate 174 which has an upper bent over rim portion 176 that slidingly fits over the top edge of the left side plate 168 to removably mount the transformer plate 174 on the left side plate 168. The transformer plate 174 is held in place on the left side plate 168 by screw type fasteners 178 or the like. If the control transformer 166 becomes defective, the service man simply unscrews the two fasteners 178 holding the transformer plate 174 against the left side plate 168 and pulls the transformer plate 174 out of the high voltage compartment as the rim 176 of the plate slidingly engages the upper edge of the left side plate 168 as shown in FIG. 14. This greatly facilitates the removal of the control transformer from high voltage compartment since the control transformer often weighs 35 lbs. or more and would be unduly cumbersome to remove otherwise, especially if an optional second control transformer was mounted on plate 174.

Turning now to FIG. 9, a magnet frame assembly 180 which supports an operating coil 182 includes an L-shaped magnet frame 184 bolted to the left side plate 168 directly beneath the transformer mounting plate 174, and a pair of bolts 186 extend through the vertical side of magnet frame 184 to removably fasten the operating coil 182 to magnet frame 184. Thus, by simply removing the two bolts 186 and disconnecting two coil leads 188, the operating coil 182 can be easily removed from the contactor for servicing or replacement without first removing other components of the contactor assembly.

An armature 190 which opens and closes the contacts of the contactor as described in Schramm et al U.S. Pat. No. 3,403,239, further includes an interlock arm 192 with a bar 194 depending downwardly therefrom to engage a contactor position interlock 198 bolted to cell tray 62. If the contactor armature 190 is in its closed (energized) position during a test with door 14 open and the contact tips meeting one another, the interlock arm 192 is pivoted downwardly so that the bar 194 engages the righthand side of the contactor position interlock 198 and the contactor cannot be racked into an engaged position. If on the other hand, someone attempts to disengage the contactor from the line bus and load connections while the contact tips are closed, the contactor interlock bar 194 will engage the lefthand side of contactor position interlock and prevent the contactor from being racked out of its engaged position as shown in FIG. 9. Moreover, the contactor position interlock 198 has a top surface 200 of a predetermined length so that the contactor interlock bar strikes the top surface 200 and the contactor tips are prevented from closing due to the interference from the contactor position interlock 198 while the contactor is being moved into an engaged position from a disengaged or test position.

Referring particularly to FIGS. 15-18, the contactor 96 also includes a multi-purpose pedestal 202 of an insulating material. The pedestal 202 has a generally triangular shape with extensions therefrom to provide various mounting functions for components of the contactor assembly. The pedestal 202 has slots 204 on either side thereof to serve as a guide and front mount for phase barriers 206 (FIG. 1) which are held in alignment by the slots 204. A flexible conductor 208 of the movable contact tip 210 is connected at one end to the pedestal 202 as well as a contact clip 212. The pedestal also serves as a mounting bracket for an option third stab assembly 214. Pedestal 202 also serves as a mounting for a power fuse clip 216 for either a single or double barrel power fuse 217 and a fuse stop bracket 218 which has a pair of ears 219 extending upwardly therefrom at the outer end to prevent a double barrel fuse from rotating sideways.

Turning now to FIGS. 15–17, a particularly advantageous control fuse assembly 220 is shown. The problem with all prior art control fuse assemblies was unfused conductors extending from a connection with the power fuse assembly to the control fuse assembly. This conductor was simply an unfused wire since the power fuse carries too many amps to adequately protect this wire which is often a No. 8 wire or less. The control fuse assembly of the present invention eliminates any unfused wire extending from the high voltage power circuit to the low voltage control circuit. The control fuse assembly 220 comprises a control fuse clip 222 mounted directly to the power fuse stop bracket 218, and a fuse retainer spring 224 mounted on the multipurpose pedestal 202 by a screw fastener 226. A lead conductor 228 connected to spring 224 by the same fastener 226, electrically connects the fuse retainer spring 224 to the control power transformer 166. A control transformer primary fuse 230 is selected on the basis of the transformer rating and is inserted rear end first into the fuse retainer spring 224 and then the front end is pushed up so that it sets firmly into control fuse clip 222.

Referring particularly to FIGS. 19 and 20, a grounding shoe 232 is bolted to the lower front corner of the left side plate 168 and acts as a positive ground connection for the contactor in both fully engaged and disengaged (test) positions as well as intermediate positions therebetween. The ground shoe 232 makes positive electrical connection with a ground assembly 234. The ground assembly 234 is bolted to the front left side of the left rail guide 84 and to the steel cell tray 62 near the front of the cell tray. The ground assembly 234 comprises a generally flat wiper plate 236 biased upwardly against the ground shoe 232 on the contactor by several springs 238 mounted within an upper U-shaped portion 240 of a base enclosure 242 and is held in place by screw fasteners 244 extending through the sides of portion 240, the springs 238 and guide holes in the wiper plate. The upper end 246 of the U-shaped portion 240 extends over a portion of the top surface of the wiper plate 236 to hold the same in place. The rear end 248 of the wiper plate 236 curves vertically downward at generally a right angle a sufficient distance to bolt a ground wire 250 to the end 248 of the wiper plate 236. The other end of the ground wire is bolted to cell tray 62. Bolted over the U-shaped portion 240 of the base 242 and extending over a portion of the width of the wiper plate 236 in a spaced parallel relation thereto is a angle guide plate 252. The guide plate 252 is spaced a sufficient distance above the wiper plate 236 that the ground shoe 232 sliding on the wiper plate 236 slides immediately beneath the guide plate 252 when the contactor is in its disengaged position or test position.

Cooperating with the ground assembly 234 and more particularly with guide plate 252 is a contactor stop block assembly 254 which is fixedly mounted to cell tray 62 immediately in front of the ground assembly 234 as shown in FIGS. 7 and 9. The contactor stop block assembly 254 comprises a U-shaped enclosure 256 with the legs of the U against the left guide rail 84, a stop block 258 is slidingly received within enclosure 256 for movement in a direction normal to the movement of a ground shoe 232 and is biased against the left guide rail 84 by a spring 260 within the enclosure 256. The stop block 258 extends upwardly past the top of the U-shaped enclosure 256 and is immediately adjacent the guide plate 252 to a height approximately that of the top surface of the guide plate 252. The stop block 258 includes an appendage 262 extending horizontally from the front of the stop block 258 and curving away from the guide rail 84. The stop block 258 prevents the contactor from being completely withdrawn from guide rails 80 unless the stop block is pivoted to the left of the guide rail 84 out of the path of the ground shoe 232. When inserting the contactor 96 onto the rail assembly, the appendage 262 on the stop block 258 engages a curved side 264 of the ground shoe 232 which automatically pivots the stop block out of a blocking position as the contactor is moved further onto the rail assembly. A guide plate 263 which is immediately above the ground shoe 232 when the shoe engages the stop block 258 prevents the ground shoe from jumping over the stop block.

Referring to FIGS. 1, 21–25, the low voltage control compartment 30 is located at the right front 266 of each starter cell. A low voltage control assembly 267 comprises the door 16 which is a drawout, swing-open panel assembly 268 comprising instrument and relay panels 270 and 272, respectively, with meters 274, pushbuttons 276, and relays 278 mounted on the instrument panel 270 and the relay panel 272 and terminal boards 280 (FIG. 1) mounted on a terminal panel 282 removably fastened to the back wall of the compartment. It is a particularly advantageous feature of the control assembly 267 that the panel assembly 268, terminal panel 282 and all components mounted thereon are assembled together in a removable unit which may be benched assembled and pretested and then plugged into the low voltage control compartment of each starter cell as a complete low voltage package as more clearly shown in FIG. 31).

The removable unit includes a pair of suspension plates 284 fixedly mounted to a pair of spaced apart tracks 286 in a slidable relationship to a pair of complementary second tracks 288 mounted on the right side wall 290 of the low voltage compartment with a bearing interface 292 therebetween. The suspension plates 284 have hex head bolts 294 extending therefrom for mounting a removable support plate 296. The support plate 296 includes key hole 298 slots that mount over post screws 294 to fasten the support plate 296 to the suspension plate 294. A pair of track stops 300 are located one at either end of each second track 288 to limit the distance the first track 286 travels on the suspension when door 16 is drawn out. The relay panel 272 is connected to the forwardmost end 302 of support plate 296 by a piano hinge 304 mounted in approximately the mid-section of the relay panel 272. The instrument panel 270 which forms the front of door 16 is attached at a right angle to relay panel 272 at the righthand side 306 with a lower support tray 308 connected to the bottom of the relay and instrument panels 272 and 270, respectively. The above described removable unit which forms the drawout, swing-open panel door assembly of the low voltage compartment rolls in and out of the low voltage compartment on the above described bearing track suspension for ease of servicing. The door assembly can be swung open in a 90° arc and locked in place by any suitable slotted hinge arrangement connected between the relay panel and the instrument panels of the door after the door 16 is drawn out of the low voltage compartment on the track suspension. This feature permits easy access for inspection and maintenance of the compartments on the relay and instrument panels, and the terminal boards. Located on the rear of the instrument panel 270 is a hinged bracket 310 upon which a thermal overload or the like can be mounted and when it is desired to inspect the heater elements, the hinged portion of the bracket 310 is swung open and the heater elements are checked without disconnecting any wires to facilitate servicing.

Figure 22:
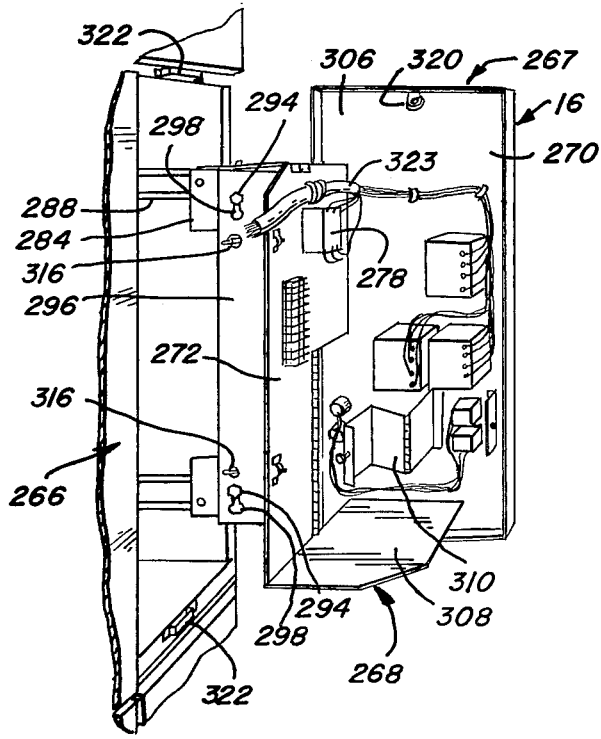
FIG. 22 is a fragmentary side view of the low voltage drawout system with its door in a swung-out position.
Figure 23:
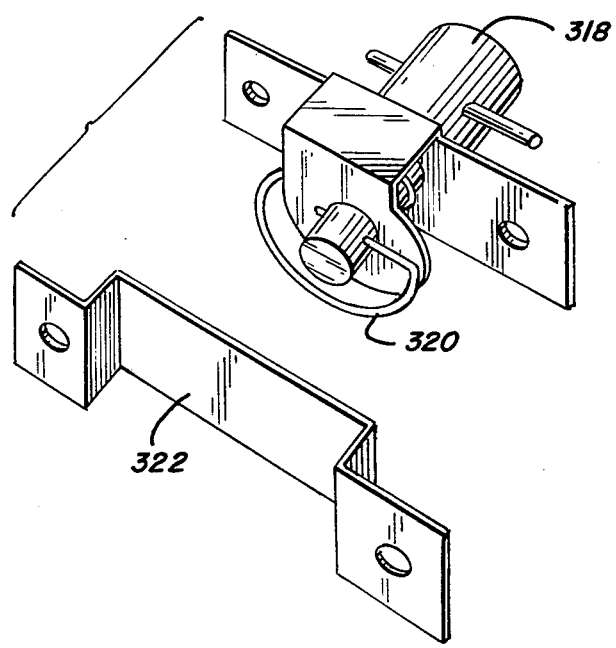
FIG. 23 is an exploded view of the low voltage compartment door handle and latch.

When closing the low voltage compartment door 16 after servicing the relay and instrument components on the panel assembly 268, the door 16 is swung back in a 90° arc so that the instrument panel 270 is parallel to the front of the enclosure 10 and held in place by spring clip fasteners 312 comprising a pair of female members 314 on the relay panel 272 and a pair of male corresponding member 316 on the support plate 296 as shown in FIGS. 1, 22 and 25.

Turning again to FIGS. 21–25, the door 16 of low voltage compartment is opened by turning a pair of handles 318 counterclockwise (approximately three-quarters of a turn to release spring latch 320 from latch lock bracket 322 mounted on the enclosure frame. The door 16 is then drawn out toward the service man by the handles until it hits track stops 300. The door is swung to the right overcoming the spring clip fasteners and out of the way for access to the components within the compartment.

Figure 31:
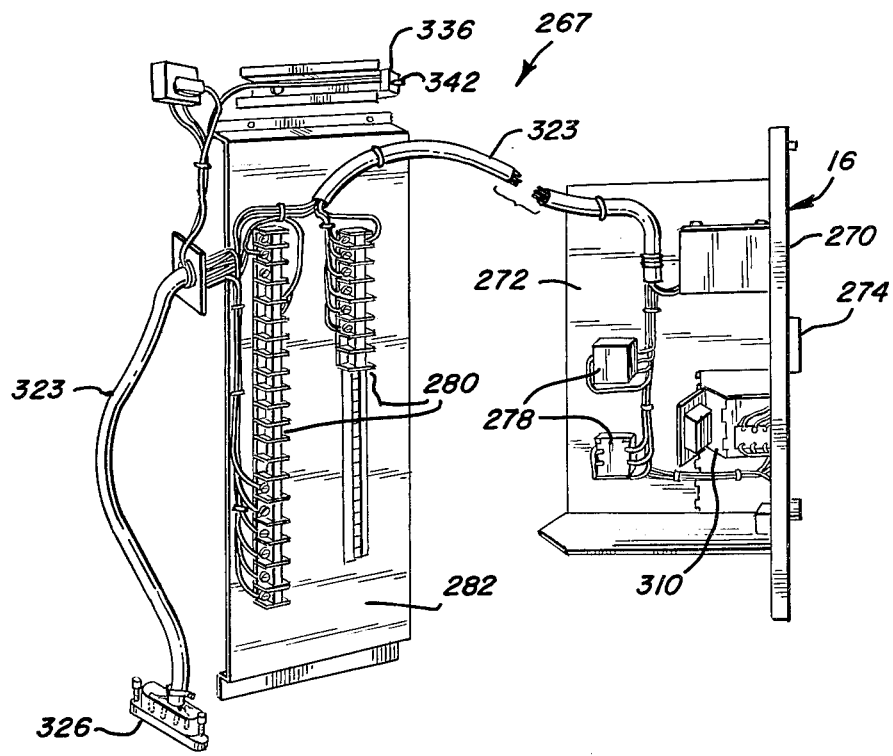
FIG. 31 is an enlargement of the low voltage unit assembly shown in FIG. 1.

Referring to FIG. 1 and FIG. 31, an umbilical cord 323 connected to the components of the low voltage compartment extends through the side between the low and high voltage compartments and across the top of the high voltage compartment in a tray 339 to connect with the low voltage connections 324 to the contactor by a quick disconnect plug 326. Therefore, the high and low voltage compartments are isolated from one another.

Turning now to FIGS. 1, 2, 6, 7 and 8, another feature of the invention is disclosed. By removing four screw fasteners 309, cell trays 62 between high voltage compartments 28 in each cell can be removed from enclosure 10 and a service man can walk into the enclosure 10 much like a telephone booth. Then by removing the metal cover barriers to the line and vertical bus and load compartments 24 and 26, respectively, the components of these compartments can easily be serviced because all of the components and wiring to facilitate quick easy inspection or replacement are front accessible by simply removing the cover barriers 54 & 58.

Referring now to FIG. 13, a synchronous motor starter circuit 328 is shown. The circuit is divided into three general sections: a high voltage section 330; a low voltage section 332; and a motor field circuit 334. In the low voltage circuit 332, the pushbutton switch 156 disconnects the secondary of the control transformer by loosening the thumbscrew 138 to provide an electrical door handle interlock which removes power from the contactor coil before the drawout handle 74 can be operated to drawout the contactor. A low voltage door interlock switch 336 (also shown in the upper lefthand corner of FIGS. 21 and 31) is closed by shutting the low voltage door 16 and if access to the low voltage compartment is attempted while the starter is energized, the switch will automatically open and de-energize the low voltage circuit shutting down the contactor. In case of an emergency, a low voltage defeat switch 338 is in parallel with the low voltage door interlock switch in the circuit so that qualified personnel can insert a small tool through a hole 340 (FIGS. 1 and 21) on the front of the instrument panel 270 which closes the switch 338. Therefore, while holding this switch 338 in a depressed position, the service man can unlatch and slide the door 16 forward until the interlock switch 336 can be closed by pulling out a switch stem 342. After activating the switch 336, the tool may be removed from hole 340. Switch 336 is automatically reset in its interlock position by closing the low voltage compartment door 16. Another feature of the low voltage circuit 332 is an economizing reactor 344 in parallel with normally closed load contacts 346 on the a.c. side of a full-wave rectifier 348 supplying the d.c. potential to coil 182. The reactor 344 is mounted on the contactor. The economizing reactor 344 minimizes heat losses in the coil circuit. The reactor is also smaller and less expensive than large wound capacitors and is less expensive than the electrolytic capacitors which are known for their failures when deenergized for long periods of time. Reactor 344 also does not produce the heat of prior art resistive economizer circuits. The reactor 344 is inactive in the circuit until the normally closed load contacts 346 open after the coil armature is energized and it chokes the a.c. current delivered to rectifier 348. Initially, the low voltage, a.c. line current which feeds the rectifier 348 is 2.2 to 3 amps just before the load contacts 346 open and the current is shunted through the reactor 344 to reduce the current to 0.6 amps. Depending upon circuit components, the d.c. voltage supplied to the coil 182 is reduced from 85 as 100 volts d.c. when the load contacts 346 are closed to 25 volts d.c. when the load contacts are open and the reactor 344 is in series with the operating coil 182.

Figure 26:
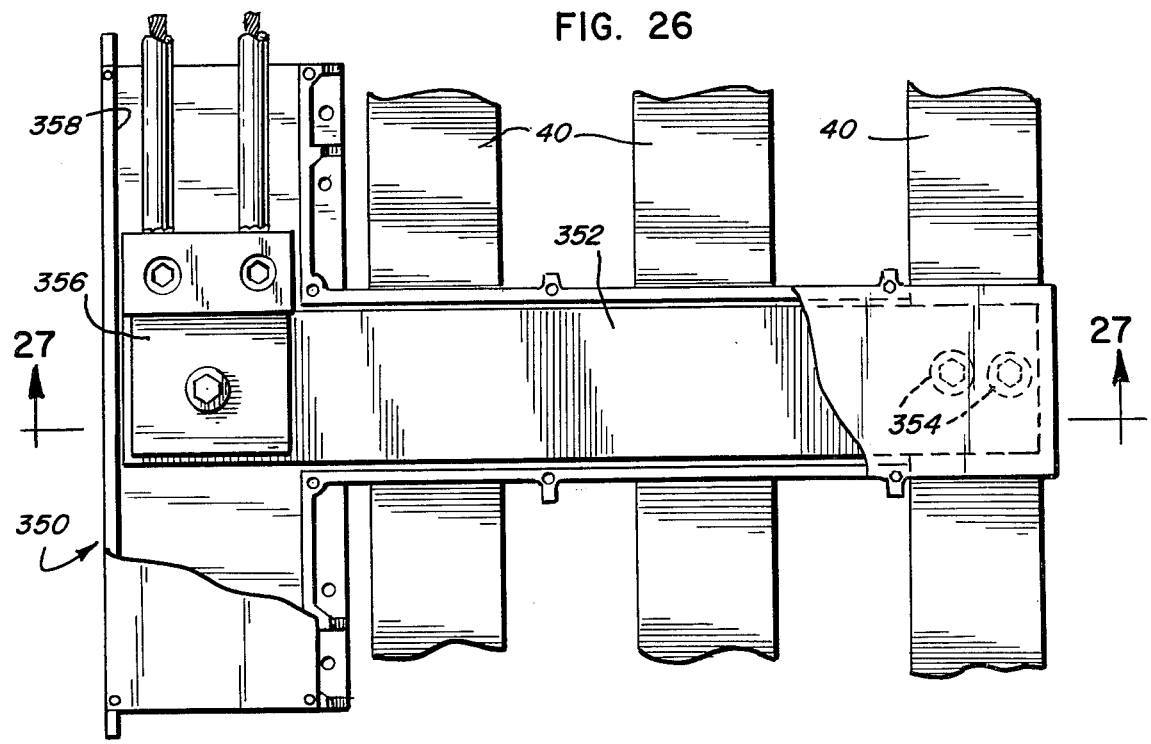
FIG. 26 is a front elevation view of the T-connection box for the incoming line and vertical bus connections.
Figure 27:
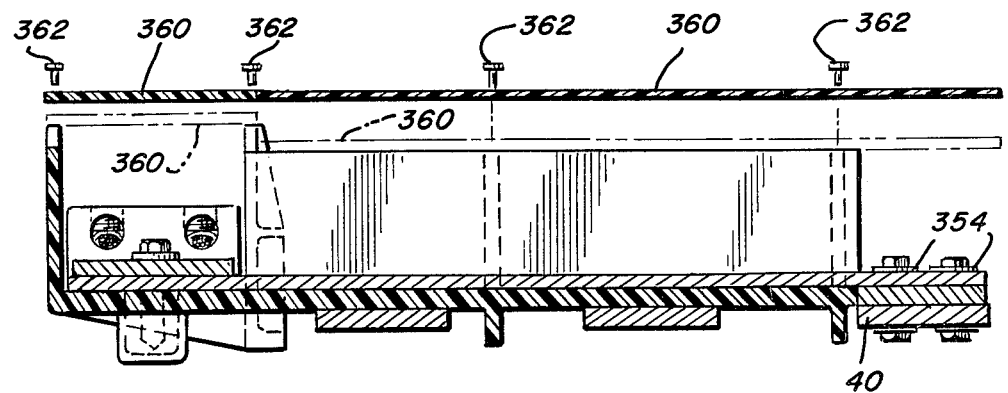
FIG. 27 is a bottom view of the connection box in FIG. 26.

Referring now to FIGS. 26 and 27, a T-connection box 350 of suitable insulating material is utilized for connecting incoming line cables to each of the vertical bus lines 40. The connection box 350 houses a bus strap 352 having a pair of holes 354 at one end for connection to the vertical bus line 40 and an incoming line terminal 356 at the other end located within the vertical section 358 of the box. A two piece cover 360 is secured to the connection box 350 by screw type fasteners 362.

Figure 28:
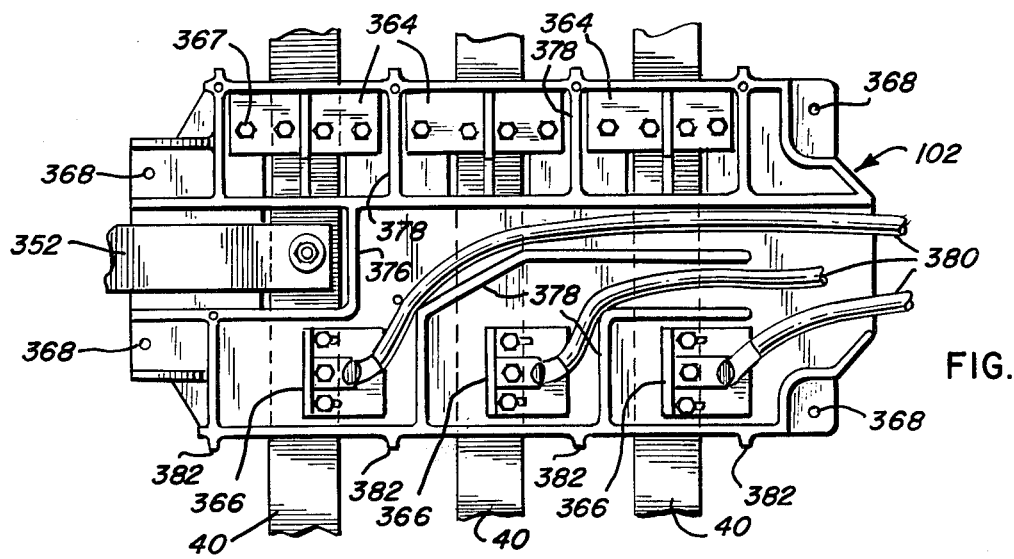
FIG. 28 is a front elevation showing line and load stab terminal connection box.
Figure 29:
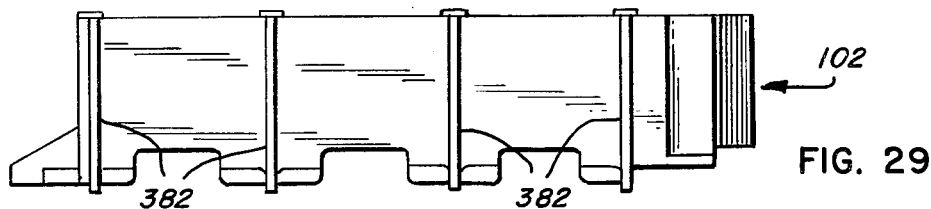
FIG. 29 is a bottom view connection box of FIG. 28
Figure 30:
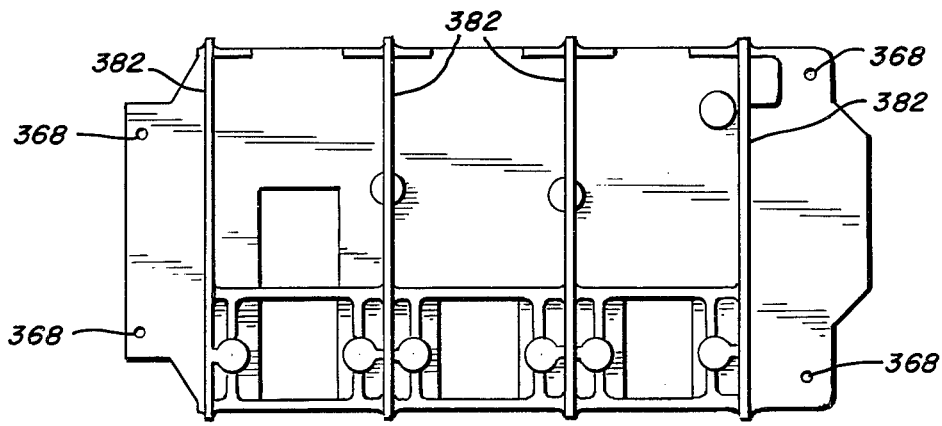
FIG. 30 is a rear elevation of the connection box in FIG. 29.

Referring now to FIGS. 28–30, all line and load stab terminal connections 364 and 366, respectively, are mounted within the single insulated connection box 102. The box 102 can be field installed by simply using only ten screw type fasteners like 367, four bolting the box to the frame of the line and vertical bus compartment 24 and six bolting the line stab terminal connections 364 to the bus line 40, two bolts for each line stab terminal connection. The fasteners 367 pass through holes 368 for connecting the box 102 to the frame and for connecting the line stab terminal connections 364 to the bus lines 40. The line stab terminal connections 364 are in turn bolted to the insulator box 102 by the same type of fasteners 367. This feature permits the line and load stab terminal connections to be pre-aligned for connection with the line and load stab fingers (shown in FIG. 15) 372 and 374, respectively, on the contactor 96 without aligning the same in the field. The line and load stab terminal connections are isolated from each other and from the phase bus strap 352 by a barrier 376. The bus strap extends a partial distance into box 102 to electrically connect the line cable to the first of the vertical line bus 40. Each line and load stab terminal connection is isolated from adjoining phases by barriers 378. Lines 380 connect the load stab terminal connections 366 to the components in load compartment 26 so that the line and vertical bus and the load compartment 24 and 26, respectively, are totally isolated from one another. Ridges 382 on the outer periphery of the box 102 prevents electrical creepage between phases. The box 102 also acts as a support for the vertical line bus 40. The line and load connection box 102 can be sawed into two sections to provide just a line or a load connection box. For instance, the lower half of connection box 102 can serve as a load stab terminal connection when the auxiliary third stab 214 which can be used as a disconnect switch for potential transformers for the static exciter circuit 334 in a synchronous motor starter as shown in FIGS. 13 and 15.

We claim:

1. A high voltage motor starter enclosure comprising:
a floor mounted vertical section comprising three starter cells, stacked one on top of the other, each cell suitable for mounting components of one motor starter, each starter cell comprising four distinct, isolated compartments, a line and vertical bus compartment, a load compartment, a low voltage control compartment having a drawout, swing-open door to provide easy access to starter components mounted therein, and a high voltage contactor compartment having a hinged door to provide easy access to a removable high voltage contactor mounted therein, each starter cell having both mechanical and electrical interlocks to minimize electrical hazards;
a plurality of removable cover barriers located within the high voltage compartment to provide front accessibility to the line and vertical bus and load compartments and to the components mounted therein;
a connection box having both line and load terminal connections, said box mounted within the line and bus compartment;
a shutter plate assembly isolating the line and load connections from the high voltage compartment;
a removable cell tray mounted in the high voltage compartment of each cell to define a floor isolating the high voltage compartments in each cell from one another, said tray having a guide means mounted thereon for slidably receiving the contactor, a shutter operator mechanism for opening and closing a shutter plate of the shutter plate assembly, a positive ground connection assembly, said contactor having a grounding means positively engaging said ground assembly in all contactor positions on said guide means;
a contactor stop assembly engaging said contactor grounding means to prevent withdrawal of the contactor from said guide means, said contactor further including an operator means for actuating the shutter mechanism; and
a shutter and contactor interlock mechanism mounted integrally with the shutter mechanism and further including an actuator means operatively responsive to the position of the hinged door on the high voltage compartment for locking out the contactor from an energized position when the door is open.

2. The high voltage motor starter of claim 1 further including:
a drawout handle operatively connected to the contactor for moving the contactor into both fully engaged and disengaged positions with the line and load connections in said connection box behind the shutter plate assembly;
a low voltage control circuit including a control transformer, a rectifier, a d.c. operated coil, a reactor connected in series with the a.c. side of said rectifier and d.c. operated coil when the coil is energized to minimize heat losses in the coil circuit;
a high voltage power circuit including a power fuse, a pair of power clip fuse springs for mounting the power fuse, a power fuse stop bracket electrically connected to the fused side of the power fuse;
a control fuse retaining means including a control fuse clip connected directly to the power fuse stop bracket and a fuse retainer spring electrically connected to the primary of the control transformer, said control fuse retaining means eliminating any unfused wires between the high voltage circuit and the primary of the control transformer in the low voltage circuit;
a thumbscrew mechanical and electrical interlock means operatively engaging the drawout handle when the contactor is in its fully engaged position with the line and load connections to prevent the opening of the high voltage compartment door with the contactor engaged to the line and load connections and to disconnect the low voltage from the operating coil when the thumbscrew is withdrawn from its locking position to de-energize the contactor before the contactor can be disengaged from the high voltage line connections.

3. The high voltage motor starter enclosure of claim 1 wherein said low voltage control compartment includes starter components mounted on the drawout, swing-open door, a terminal mounting plate removably mounted in the low voltage compartment, an umbilical cord having low voltage line connections connecting the component parts on said door to the terminal board and to low voltage connections on the contactor within the high voltage compartment, said low voltage compartment door being removably connected to the drawout suspension within the low voltage compartment so that the door, the terminal panel and umbilical cord are all assembled together in a removable unit which may be bench assembled and pretested and then plugged into the low voltage compartment of each starter cell as a complete low voltage package.

4. The high voltage motor starter enclosure of claim 1 further including:
a magnet frame assembly including a generally L-shaped bracket mounted on the contactor having two apertures therethrough, a pair of screw fasteners passing through said apertures for removably mounting said operating coil to the magnet frame assembly so that by removing said screw fasteners and disconnecting the primary leads to the operating coil, the coil can easily be serviced or replaced if defective.

5. The high voltage motor starter enclosure of claim 1 further including:
a control transformer;
a transformer mounting plate for mounting the control transformer thereon having an upper rim portion, said contactor having a side plate, said rim portion of the transformer mounting plate slidingly fits over the top edge of the side plate, a fastener securing the transformer mounting plate to the side plate of the contactor whereby a service man simply loosens said fastener securing the transformer plate against the contactor side plate and pulls the transformer plate directly out of the high voltage compartment in a generally horizontal plane as the rim of the transformer mounting plate slidingly engages the upper edge of the conactor side plate to facilitate the removal of the heavy control transformer within the high voltage compartment.

6. In a high voltage motor starter enclosure having line and load connections, high and low voltage compartments having door enclosures, a removable tray assembly including a rail assembly, a contactor movably mounted on the rail assembly within the high voltage compartment, a drawout handle operatively connected to the contactor to slidably move the contactor into both fully engaged and disengaged positions with the line and load connections, the improvement comprising:

means, positioned between the line and load connections and the contactor and responsive to an open high voltage compartment door, for isolating the contactor from the line and load connections in its disengaged position;

means responsive to the movement of the contactor and to a closed door position of the high voltage compartment, for removing the isolating means between the line and load connections and the contactor, said removing means mounted on the removable tray assembly and preventing engagement of contactor to line and load connections with the door of the high voltage compartment open; and means, responsive to the energizing and de-energizing of the contactor coil, for locking the contactor out of both engagement and disengagement with the line and load connections when the contactor coil is energized and for permitting both engagement and disengagement of the contactor with the line and load connections when the contactor coil is de-energized without overriding the removing means when the door is open to the high voltage compartment.

7. The high voltage motor starter enclosure of claim 6 further including means, responsive to the opening of the low voltage compartment door, for de-energizing the contactor and thereby removing said lockout means.

8. The high voltage motor starter enclosure of claim 7 further including means for defeating the de-energizing means mounted on the low voltage compartment door and responsive to a tool insertion for activating the same.

9. The high voltage motor starter enclosure of claim 6 further comprising means, mounted on the drawout handle and high voltage compartment, for locking the handle in its contactor fully engaged position and for de-energizing the contactor before the handle can be moved to its contactor disengaged position.

* * * * *

UNITED STATES PATENT AND TRADEMARK OFFICE
CERTIFICATE OF CORRECTION

PATENT NO. : 4,090,230

DATED : May 16, 1978

INVENTOR(S) : Frederick B. Fuller, et al

It is certified that error appears in the above—identified patent and that said Letters Patent are hereby corrected as shown below:

| COLUMN NO. | LINE NO. | DELETE | INSERT |
|---|---|---|---|
| 1 | 32 | "has" | -- had -- |
| 5 | 68 | "84" | -- 80 and 84 -- |
| 6 | 3 |  | after stationary -- shutter -- plate |
| 6 | 15 | "(FIG. 1)" | -- (FIG. 7) -- |
| 10 | 15 | "80" | -- 80 and 84 -- |
| 10 | 54 | "294" | -- 284 -- |
| 11 | 7-8 | "compartments" | -- components -- |
| 11 | 22-23 | "male corresponding member" | -- male members -- |
| 15 | 10 | "conactor" | -- contactor -- |
| 15 | 27 |  | after means -- , -- |

Column 4, line 57, insert -- 26 --"after load compartment".

Signed and Sealed this

Seventeenth Day of July 1979

[SEAL]

Attest:

Attesting Officer

LUTRELLE F. PARKER
Acting Commissioner of Patents and Trademarks